March 24, 1970 P. S. TEER ET AL 3,502,981
ALTERNATING CURRENT METER AMPLIFIER
Filed July 28, 1967
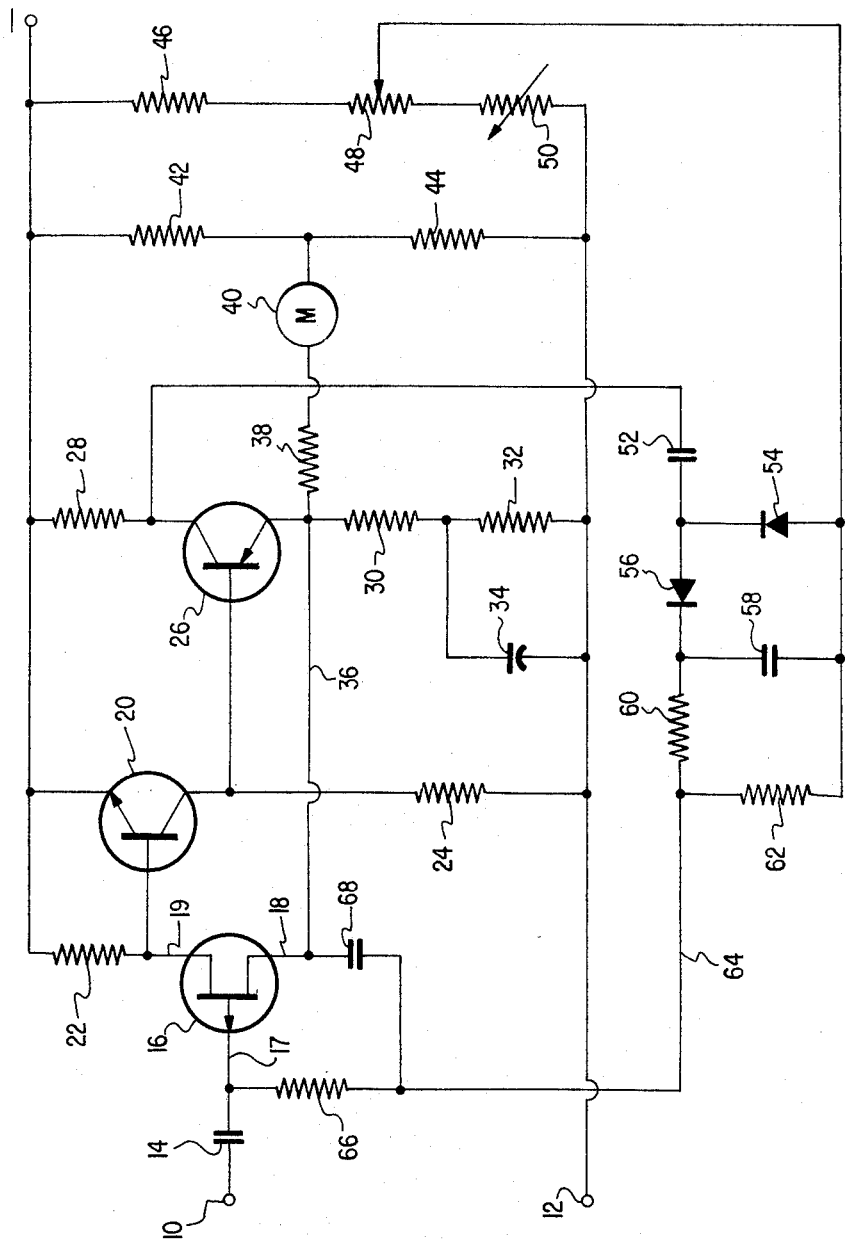
INVENTORS.
PETER S. TEER
HOWARD F. BARKER
BY
*Burns, Doane, Benedict, Swecker & Mathis*
ATTORNEYS.

United States Patent Office 3,502,981
Patented Mar. 24, 1970

3,502,981
ALTERNATING CURRENT METER AMPLIFIER
Peter S. Teer, Johnson City, and Howard F. Barker, Endwell, N.Y., assignors to Amphenol Corporation, Oak Brook, Ill., a corporation of Delaware
Filed July 28, 1967, Ser. No. 656,774
Int. Cl. G01n 1/30
U.S. Cl. 324—123                6 Claims

ABSTRACT OF THE DISCLOSURE

An alternating current meter amplifier in which the amplified output of a high input impedance field effect transistor is detected and a portion thereof is fed back to the input of the field effect transistor to increase the input impedance thereof.

BACKGROUND OF THE INVENTION

This invention relates to alternating current meter amplifiers and more particularly to alternating current meter amplifiers utilizing field effect transistors with high input impedances.

Meter amplifiers are commonly used to amplify alternating current signals, detect the amplified signal, and to indicate the magnitude of the detected direct current voltage on a meter scale in order that the magnitude of the alternating current signal may be determined. As many meter amplifiers are utilized to measure voltages in complex electronic circuitry, it is often desirable to have a high input impedance meter amplifier in order not to load down the electronic circuitry being measured.

It has heretofore been desired to utilize transistors in meter amplifier applications due to their stability, reliability and the like. However, conventional transistors are comparatively low impedance devices and their input resistances cannot ordinarily be made to approach infinity as can an electronic tube input grid circuit. Problems have thus heretofore arisen with the utilization of conventional transistors in circuits requiring very high input impedances, such as certain alternating current meter amplifiers.

Meter amplifiers heretofore developed have also not been completely satisfactory with respect to operating stability in the face of temperature changes. Further, the use of semiconductor diodes in the detector circuits of meter amplifiers has caused difficulty, as the impedances of such diodes vary non-linearly upon varying levels of the alternating current input signal. This non-linearity of the diodes often requires the use of non-linear meter scales and other undesirable remedies.

SUMMARY OF THE INVENTION

In recognition of the foregoing deficiencies in the prior art, it is a general object of the present invention to provide an alternating current meter amplifier which substantially minimizes or eliminates the disadvantages of meter amplifiers heretofore available.

A more specific object of the present invention is the provision of a meter amplifier utilizing a field effect transistor as an input device in order to provide a high input impedance.

Another object is the provision of a meter amplifier utizing a field effect transistor both to provide a high impedance input and also to monitor the output of detector circuitry.

Yet another object of the present invention is the provision of a meter amplifier having a complimentary configuration in order to cancel direct current drift and also to prevent the amplification of voltage supply conducted alternating current noise.

A further object of the present invention is the provision of a meter amplifier wherein the dynamic range of the amplifier and the non-linearity of the detector circuitry is automatically compensated as the alternating current input signal varies.

In achieving these and other objects as will be apparent hereinafter, the instant invention provides circuitry utilizing a field effect, or unipolar, transistor in the input of a transistor amplifying circuit. Detector circuitry is connected to the output of the amplifying circuitry in order to supply a direct current voltage representative of the amplitude of the alternating current signal. A portion of the output of the detector circuitry is fed back to the input of the field effect transistor in order to provide both a high input impedance for the amplifier circuitry and also to compensate for non-linearity in each type of circuitry during varying alternating current signal levels.

BRIEF DESCRIPTION OF THE DRAWING

The invention and its many advantages may be further understood by reference to the following detailed description illustrated in the accompanying drawing which is a schematic diagram of the alternating current meter amplifier of the present invention.

DESCRIPTION OF THE PREFERRED EMBODIMENT

Referring to the drawing, a low magnitude alternating current signal is fed by suitable means to the input terminals 10 and 12. The coupling capacitor 14 connects the terminal 10 to a field effect transistor 16, while terminal 12 is connected to ground. The field effect transistor, also known as a unipolar transistor, comprises a first contact 17 termed the gate which is disposed centrally on a length of semi-conductor material. A second contact 18 called the source and a third contact 19 called the drain are spaced apart on the semi-conductor material. Current of majority carriers enters the semi-conductor material from the source 18 and leaves through the drain 19. The source and drain contacts are both generally ohmic contacts, while the gate is generally a rectifying contact.

The magnitude of the current flowing between the source and the drain may be controlled by application of a reverse bias to the gate 17 by virtue of the creation of a depletion layer at the rectifying contact junction. The source and the drain of the field effect transistor define a region termed the channel, whose effective size is variable depending upon the magnitude of the reverse bias applied to the gate. Upon the application of a relatively large gate voltage, the transistor becomes "pinched" and the channel circuit resistance becomes very high.

The drain 19 of transistor 16 is connected to the base of a bipolar n-p-n transistor 20. A biasing resistor 22 is connected between the drain 19 and a suitable negative voltage supply. A resistor 24 is connected between the collector of transistor 20 and circuit ground.

The collector of transistor 20 is connected directly to the base of bipolar p-n-p transistor 26. A biasing resistor 28 is connected between the collector of transistor 26 and the source of direct current biasing voltage. Resistors 30 and 32 are connected between the emitter of transistor 26 and circuit ground. Resistor 32 is by-passed by capacitor 34 in order to overcome any degenerative effect due to the resistor. A feedback loop between the emitter of transistor 26 and source 18 of transistor 16 is provided by lead 36.

An isolating resistor 38 is connected between the emitter of transistor 26 and a conventional meter 40. Voltage division resistors 42 and 44 are connected to one side of meter 40. Adjustment of the zero balance of the meter 40, to be later further described, is provided by resistor 46, potentiometer 48, and variable resistor 50.

The collector of transistor 26 is connected through a capacitor 52 to a detector network comprising diode 54 and 56. The anode of diode 54 is connected to the movable element of potentiometer 48 to allow level adjustment of the circuit. Capacitor 58 is connected across the diodes 54 and 56 in order to provide a direct current voltage representative of the peak-to-peak magnitude of the input alternating current signal. The desired detector impedance load is provided by resistors 60 and 62 which are connected across capacitor 58. A lead 64 connects the detected direct current signal to the gate 17 of the field effect transistor through a resistor 66. A capacitor 68 connects lead 64 to source 18 of the field effect transistor.

In the preferred embodiment, field effect transistor may be a U-147 (P channel) type. The amplifying transistors 20 and 26 may be a 2N2926 and a 2N3638, respectively. When these particular transistors are used, values for the remaining circuit elements may be as follows:

| | |
|---|---|
| C14—.01 μf. | R46—22K |
| R22—33K | R48—1K |
| R24—56K | R50—10K pot |
| R28—2K | C52—.47 μf. |
| R30—200 | C58—.47 μf. |
| R32—1.2K | R60—820K |
| C34—100 μf. (15 v.) | R62—2.5 meg. |
| R38—10K | R66—4.7 meg. |
| R42—15K | C68—.05 μf. |
| R44—6.8K | |

The operation of the present circuitry may be best understood by reference to the drawing and assuming the application of a low magnitude alternating current signal across the input terminals 10 and 12. The alternating current signal is amplified by transistors 16, 20 and 26 and coupled to the detector circuit through the coupling capacitor 52 from the collector of transistor 26. The amplified alternating current signal is detected by diodes 54 and 56 and a direct current voltage builds up on capacitor 58 having a magnitude proportional to the peak-to-peak amplitude of the input alternating current signals.

Feedback from amplifying transistor 26 is provided through lead 36 to the source 18 of the field effect transistor 16 for stability of gain. The feedback holds the magnitude of the alternating current gain provided at the collector of transistor 26 extremely stable to a value approaching the magnitude of resistor 48 divided by the magnitude of resistor 30. Further, the feedback cancels the effect of gate-to-source capacity in transistor 16.

The complimentary configuration of the present circuitry tends to cancel direct current drift in the detector circuitry due to temperature changes, in addition to preventing the amplification of bias voltage supply conducted alternating current noise. The three transistors in the circuit increase current substantially instantaneously, thus tending to minimize the tendency of the circuit to oscillate.

The magnitudes of the voltage division resistors 60 and 62 are chosen to provide the desired loading for the detector and also to attenuate the level of the direct current voltage to a level within the range of the unipolar transistor 16. A portion of the direct current voltage is thus fed through resistor 66 to gate 17 of the field effect transistor 16. This causes the unipolar transistor 16 to be biased to provide an extremely high input impedance for the meter amplifier circuitry.

The direct current voltage level from the detector is coupled from the emitter of transistor 26 through the isolating resistor 38 to the meter 40, where an indication is provided of the peak-to-peak level of the input alternating current signal. Due to the fact that only a portion of the direct current voltage from the detector circuitry is fed to gate 17, the potentiometer 48 and variable resistor 50 are provided in order to adjust the zero level of meter 40. Coarse zero adjustments of meter 40 may be made by varying the magnitude of resistor 50, while fine zero adjustments may be made by means of the potentiometer 48.

The resistor 66 may have a magnitude of many megohms, and thus a very high input impedance in the order of $10^8$ is available with the present circuitry. Very accurate peak-to-peak detection of very low level alternating current input signals is possible with the present circuitry by utilizing the same field effect transistor to provide a very high alternating current input impedance, as well as to monitor the direct current output of the detector. Further, the novel bias arrangement of the present circuitry substantially cancels any variation in the gate-source voltage of the field effect transistor 16, in order to make the voltages of the present circuitry independent of the transistors.

In addition to the advantages briefly discussed, the provision of the field effect transistor and the feeding back of a portion of the detector output to the gate of the transistor also automatically compensates the output of the circuitry for non-linearities introduced by variance of the detector impedance upon the occurrence of varying input alternating current signal levels. Both the dynamic range of the amplifier circuitry and the linearity of the detector are adjusted in the event of varying input signal levels, as the amplifier circuitry is driven toward cut-off by the detector output as the alternating output signal level increases.

The present configuration of the three transistors 16, 20 and 26 provides neear unity direct current gain impedance conversion for the detector circuitry. The input to the detector circuitry may alternatively be derived from the emitter of transistor 26. Further, taking the input tot he detector circuitry from the collector of transistor 26 may provide a direct current gain in excess of unity.

While a preferred embodiment of the present invention has been described, the invention should not be limited to the exact apparatus illustrated, as various modifications which do not depart from the essence of the present invention will be obvious to those skilled in the art.

What is claimed is:
1. A meter amplifier circuit comprising:
  unipolar transistor means having a gate and a channel region,
  input terminal means adapted to supply said gate with an alternating current signal,
  amplifier means connected to said channel region for amplifying the alternating current signal,
  meter means connected to said amplifier means for providing an indication of the magnitude of the direct current voltage representative of the amplitude of the alternating current signal,
  means for adjusting the level of said meter means providing a direct current bias,
  detector circuitry connected to said amplifier means and to said level adjusting means for providing a direct current voltage representative of the amplitude of the alternating current signal added to a portion of the direct current bias supplied by the level adjusting means, and
  means for feeding a portion of the direct current voltage to said gate of said unipolar transistor means in order to provide a high input impedance for the meter amplifier circuit and to compensate for non-linearities in the meter amplifier circuit occurring during varying alternating current signal levels.

2. The apparatus of claim 1 wherein said amplifier means comprises:
  first bipolar transistor means having a base connected to said channel region of said unipolar transistor means, and
  second bipolar transistor means having a base connected to the output of said first bipolar transistor means, said detector circuitry connected to the output of said second bipolar transistor means.

3. The apparatus of claim 2 comprising:
a feedback loop connected between said second bipolar transistor means and said channel region of said unipolar transistor means to provide stability of gain.

4. The apparatus of claim 2 wherein said detector circuitry comprises a pair of semiconductor diode means, each of said diode means rectifying a different polarity of the alternating current signal, and
capacitor means connected across said diode means for providing a direct current voltage representative of the peak-to-peak amplitude of the alternating current signal.

5. The apparatus of claim 4 comprising:
voltage division resistor means connected across said capacitor means, and
resistor means having a relatively large magnitude connected between said gate of said unipolar transistor and said voltage division resistor means for feeding a predetermined portion of the direct current voltage to said gate.

6. The apparatus of claim 5 comprising:
variable resistor means connected to said detector means for allowing calibration of said meter means by adjustment of the level of operation of said detector means.

References Cited

UNITED STATES PATENTS

| | | | |
|---|---|---|---|
| 2,368,351 | 1/1945 | Ewen | 324—123 XR |
| 3,193,767 | 7/1965 | Schultz | 325—414 XR |
| 3,243,709 | 3/1966 | Dodge | 325—414 XR |

FOREIGN PATENTS 241,530  12/1964  Austria.

OTHER REFERENCES

Smith, B.: "Infinite–Z Junction–FET Electrometer Amplifier"; EEE–Magazine of Circuit Design Engineering; n. 2; vol. 14; February 1966; pp. 63 to 66.

RUDOLPH V. ROLINEC, Primary Examiner

ERNEST F. KARLSEN, Assistant Examiner